United States Patent [19]
Thoss

[11] Patent Number: 5,701,716
[45] Date of Patent: Dec. 30, 1997

[54] TIMBER CONNECTING SYSTEM AND TIMBER CONNECTING ELEMENT

[75] Inventor: Werner Thoss, Nagold, Germany

[73] Assignee: Kerl Holzbau GmbH, Niedernhall, Germany

[21] Appl. No.: 553,639

[22] PCT Filed: Mar. 24, 1995

[86] PCT No.: PCT/EP95/01112

§ 371 Date: Jan. 19, 1996

§ 102(e) Date: Jan. 19, 1996

[87] PCT Pub. No.: WO95/26446

PCT Pub. Date: Oct. 5, 1995

[30] Foreign Application Priority Data

Mar. 26, 1994 [DE] Germany ............ 44 10 534.7
Mar. 26, 1994 [DE] Germany ............ 44 10 535.5

[51] Int. Cl.⁶ .................................................. E04B 1/38
[52] U.S. Cl. ............ 52/713; 52/712; 403/256; 248/74.1; 248/230.8; 256/54; 256/68
[58] Field of Search .............. 52/712, 713, 715, 52/736.2, 233, 364, 262; 256/43, 54, 68, 65; 248/230.8, 74.1; 403/256, 261, 230, 234

[56] References Cited

U.S. PATENT DOCUMENTS

| | | |
|---|---|---|
| 2,668,995 | 2/1954 | Morrow . |
| 3,256,030 | 6/1966 | Banse ................. 52/712 X |
| 3,633,250 | 1/1972 | Romney . |
| 3,820,909 | 6/1974 | Schindler et al. ......... 256/65 X |
| 3,960,367 | 6/1976 | Rogers ................. 256/65 X |
| 4,229,919 | 10/1980 | Hughes . |
| 4,313,688 | 2/1982 | Daniels ................. 52/712 X |
| 4,899,991 | 2/1990 | Bronkan ............... 256/65 X |

FOREIGN PATENT DOCUMENTS

| | | |
|---|---|---|
| E 28 347 | 11/1987 | Austria . |
| 2 105 002 | 4/1972 | France . |
| 586379 | 10/1933 | Germany . |
| 8814225 U | 2/1989 | Germany . |
| 9115826 U | 6/1992 | Germany . |
| 41 42 220 | 7/1993 | Germany . |
| 9310494 U | 11/1993 | Germany . |
| 1384922 | 2/1975 | United Kingdom ........ 248/74.1 |
| 2 005 325 | 4/1979 | United Kingdom . |
| WO 87/03634 | 6/1987 | WIPO . |

*Primary Examiner*—Robert Canfield
*Attorney, Agent, or Firm*—Herbert Dubno

[57] ABSTRACT

A timber connecting system for wood structures and especially post and beam structures in which the post is encircled by at least one connecting element having two spaced apart ring bands with an open side and a pair of straps connecting the ring bands and extending away from the post which is encircled by the ring bands. The beam is received between the straps and a further beam can be supported relative thereto by another connecting element whose U-shaped retaining parts engage the respective beams and have closed sides pivotally connected together.

6 Claims, 4 Drawing Sheets

TIMBER CONNECTING SYSTEM AND TIMBER CONNECTING ELEMENT

CROSS REFERENCE TO RELATED APPLICATIONS

This application is national phase of PCT/EP95/01112 filed 24 Mar. 1995 and based, in turn, on German national applications P 44 10 535.5 filed 26 Mar. 1994 and P 44 10 534.7 filed 26 Mar. 1994 under the International Convention.

The present invention relates to a wood or timber connecting system for wooden structures, such as pergolas, open garages, bus shelters, etc. The invention also relates to a wood or timber connecting element for connecting vertical posts and wooden beams fixed substantially perpendicularly thereto.

BACKGROUND OF THE INVENTION

Frequently in the case of fences, pergolas, open garages and the like, use is made of round timbers or timber, concrete posts, to which is then fixed the wooden beam as a girder for a fence panel or side wall, e.g. for a garage. The connection between the post and the wooden beam normally takes place by means of mechanical parts, such as hinges, screw connections, brackets, etc. All these elements suffer from the disadvantages that they damage the wood of the post assembly is complicated, a flexible adaptation to the most varied shapes and easy disassembly and modification are not possible.

The connection of the individual timber components of the aforementioned wooden structures conventionally takes place by means of brackets, screw connections or structural notches in the individual components. With such wooden structures it is a common problem to have to connect or join vertical supports, which are frequently made from round timbers or from concrete, and horizontal components arranged substantially at right angles thereto and which are known as main girders. The main girders can also carry secondary girders. It is disadvantageous in the hitherto known fastening and fixing modes, that on the one hand there is no structural wood or timber protection, because wooden parts can be damaged or surfaces occur in the wood on which water can collect and can lead to the premature destruction of the wood, and on the other hand it is difficult to bring about a variable structural form differing from the right-angled ground plan.

GB 2 005 325 A discloses a metallic connecting element for the connection or joining of metal fences, which has a ring band open on one side and whose internal diameter substantially corresponds to the external diameter of the post. Mounting or fastening straps are shaped onto the open ends of the ring band for fastening purposes and between them can be fastened a fence element. The fastening straps are wider than the ring band. Thus, on one post it is possible to use two connecting elements, which are rotated by 180° about the longitudinal axis thereof relative to one another. One connecting element points in one direction and the other connecting element in the other direction. Therefore the two connecting elements can be fastened to the post in tightly engaging manner without there being any vertical displacement of the individual fence panels. Upon rotation through 180° about the longitudinal axis, the fastening means in the fastening straps are arranged axially symmetrically.

DE 586 379 discloses a device for fastening fence members, which has a U-shaped construction and on the base is mounted a rotary manner on a fastening element for fitting the device to a post. As a result of the rotary mounting random angles with respect to the post can be obtained in a simple manner.

OBJECT OF THE INVENTION

The object of the present invention is to provide a timber connecting element and timber connecting system appropriate for wooden construction, which allows a simple assembly and modification, while keeping to a minimum the damage to the individual timber components.

SUMMARY OF THE INVENTION

The timber connecting system of the invention which achieves this object, has a first connecting element between a vertical post and a horizontal wooden beam, which engages in circular manner around the post by means of one or more ring bands and can be fixed to the wooden beam by fastening straps. The post can be made from wood or other materials and can be round or square. By the fixing of the wooden beam to the fastening straps and the tilting as a result of the load, the first connecting element is held on the post without any further fastening. The first connecting element has two or more spaced ring bands open on one side and whose internal diameter substantially corresponds to the external diameter or the circumferential circle of an angular post. On the open ends of the ring bands are provided two fastening straps for the wooden beam, which are wider than the inside width of the ring bands and which is obtained from the spacing of the outer edges of the two outer ring bands. The spacing of the ring bands at least corresponds to the width of the ring bands. For the retaining of an angular wooden beam, the fastening straps can be planar or at least partly curved and adapted to the round shape of a corresponding wooden beam. The fastening means in the fastening straps for the wooden beam are so positioned that they are axially symmetrical to a 180° rotation about the longitudinal axis. Through the wide fastening straps and the special arrangement of the fastening means, it is possible by rotating by 180° about the longitudinal axis to heightwise position two wooden beams to be fixed to a post. The ring bands of the connecting elements engage in one another, so that, located parallel to one another in the gaps between the ring bands of the other connecting element, they engage round the post. A second connecting element between the substantially horizontally directed wooden beam has two U-shaped retaining parts, which on their closed faces are interconnected so as to rotate about the longitudinal axis. Through these two connecting elements of the timber connecting member the ground plans of the wooden structures can be varied a simple manner and can differ from a right-angled construction. Through the first connecting element two wooden beams fixed to a post can be mutually adjusted with a random angle by simply turning and through the second connecting element the main and secondary girders can be adapted to the angle resulting from the fastening to the post.

According to a preferred embodiment the fastening straps have a stop for the wooden beam as an assembly aid. This stop can be in the form of a bolt, which is carried by both fastening straps. During assembly the wooden beam to be fixed and which can also have a correspondingly shaped recess for this purpose, is brought up to the stop, so that bores in the wooden beam can be made to more easily coincide with corresponding bores in the fastening straps.

To keep the unventilated surface of the timber as small as possible, according to another advantageous embodiment the ring band face and/or the retaining straps have timber ventilation holes.

According to another preferred embodiment, in the case of the second connecting element the connection of the retaining parts takes place by means of a shaft to which the said parts are fixed so as to rotate by 360°. This allows any random angle between the individual wooden beams.

In order to obtain an optimum constructional timber protection the retaining parts can have additional holes for ventilating the timber. According to a preferred embodiment the timber parts are spaced from the retaining part, so that moisture can drain off and no surfaces can form on which water collects and can consequently lead to a premature rotting of the wood.

By means of the timber connecting system according to the invention it is consequently possible to construct wood structures, such as are frequently produced on a do-it-yourself basis in the horticultural field, which do not have a rectangular ground plan shape. The connecting elements can be easily assembled and disassembled, which also makes it easier for non-experts to use this system. As in particular the posts are not damaged, it is possible to use them again in a different design and ground plan form.

Additionally, in the fastening straps a stop is provided as an assembly aid for the wooden beam and this step can be constructed in the form of a screw bolt. In addition, the wooden beam can have on one face a notch with which it engages round the bolt. During assembly the wooden beam is moved up to the stop between the fastening straps, so that automatically the bores in the wooden beam are made to coincide with the bores in the fastening straps.

The dimensions of the ring band diameter with respect to the post used and the mutual spacing of the fastening straps with respect to the wooden beam to be retained can be chosen in such a way that the bracing of the beam simultaneously brings about an additional bracing of the ring band or bands around the post. The post can be round or angular. According to a preferred embodiment the fastening straps have a spacing corresponding to the wooden beam thickness. Therefore the ring band is not tightened round the post and instead fastening takes place in that the ring band is tilted by the load of the beam and consequently no movement of the timber connecting element along the post takes place. This more particularly applies if, as in the case of a fence, wooden beams are positioned to the right and left of the post and therefore two timber connecting elements are closely engaged.

Preferably the fastening straps are substantially rectangular, one edge being aligned with an edge of the ring band or the outer ring band. Thus, with minimum material expenditure a reliably functioning timber connecting element is obtained. In addition, the ring band face and/or retaining straps have holes for the ventilation of the timber, so that a minimum water quantity forms behind the timber connecting element which could damage the wood.

As has been stated hereinbefore, it is possible with the timber joining element according to the invention, in simple manner to remove and modify existing timber connections without having to take account of the angles at which the individual square timbers are fixed to a post. The timber connecting element permits a completely flexible design and at the same time a constructional timber protection is obtained in that the minimum quantity of wooden parts are notched, drilled or otherwise modified.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
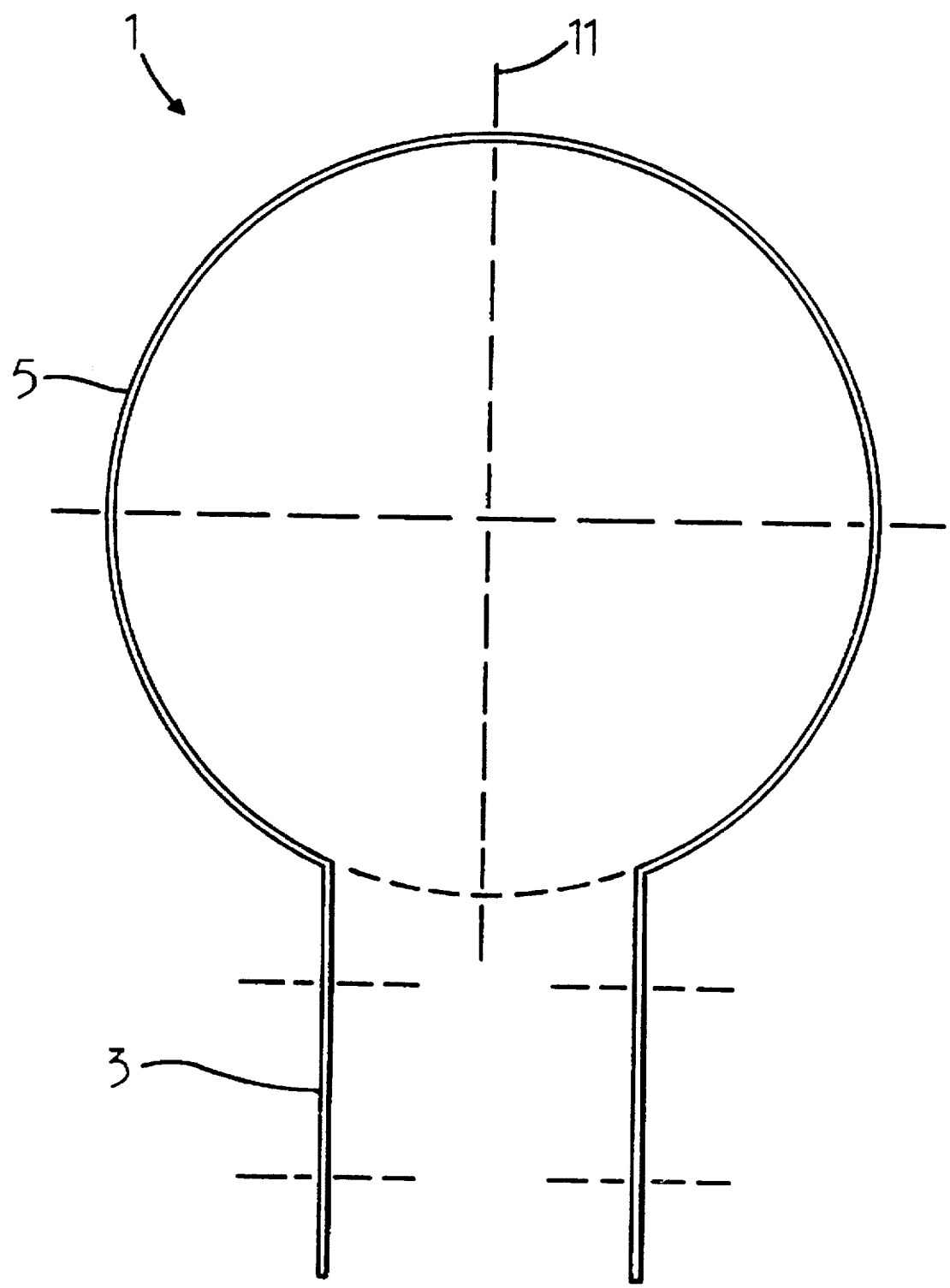
FIG. 1 is a plan view of a first connecting element.

FIG. 1 is a plan view of a first wood or timber connecting element 1 with a ring band 5, to whose open ends are connected two fastening or fixing straps 3 used for fixing a wooden beam. The ring band 5 passes round a post, which can be both round and angular.

Figure 2:
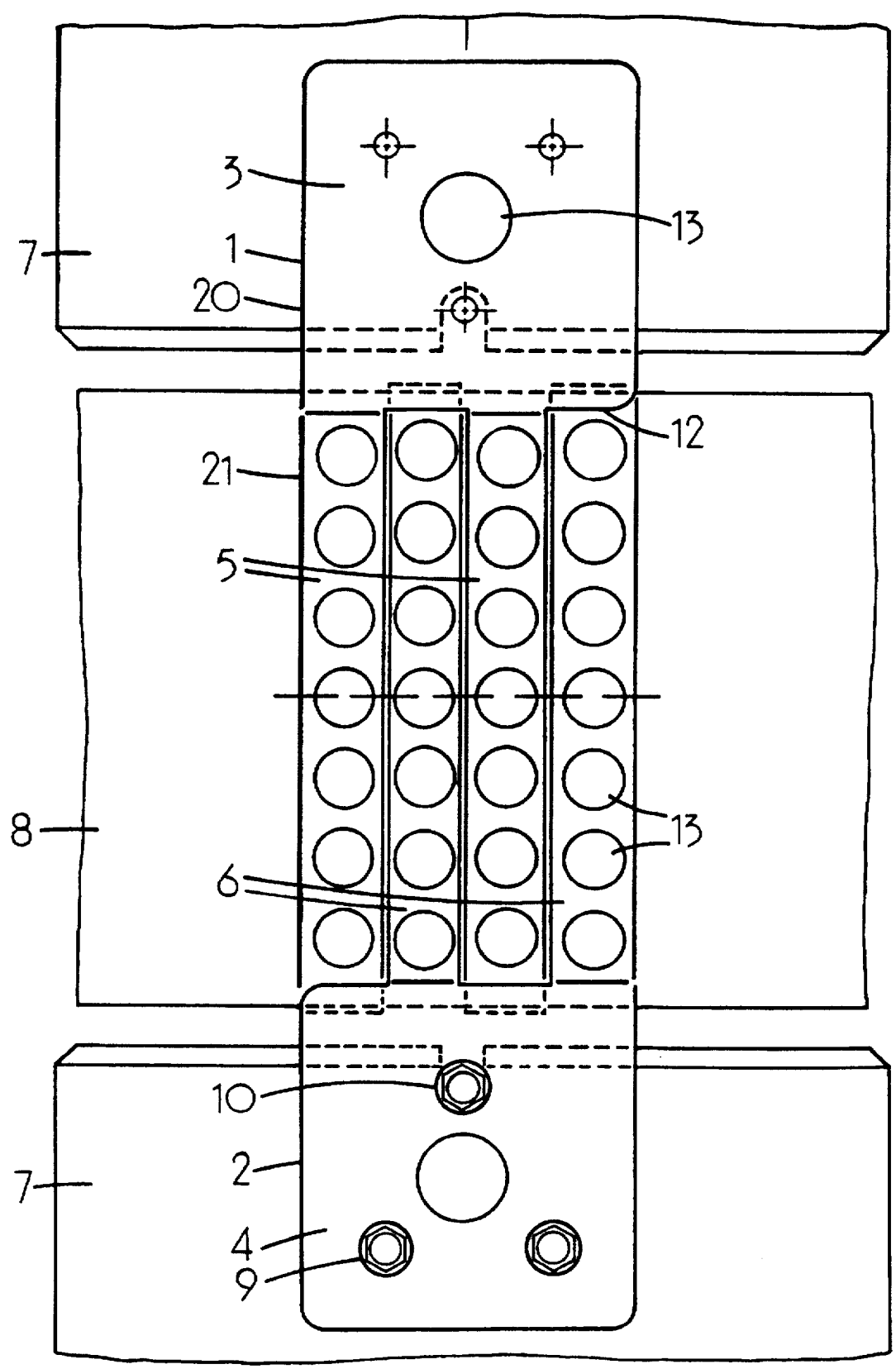
FIG. 2 A side view of two first connecting elements, which fasten wooden beams to a post.

FIG. 2 shows two first timber connecting elements 1, 2, to whose fastening straps 3, 4 is in each case fixed a wooden beam 7. Each timber connecting element 1, 2 has two ring bands 5, 6, which engage round the vertical post 8. The ring bands 5, 6 of a timber connecting element are spaced from one another, the spacing at least corresponding to the width of the ring band. Thus, it is possible to obtain a space-saving arrangement of two timber connecting elements, as can be gathered from the drawing. Simultaneously the fastening straps 3, 4 are constructed in such a way that they are wider than the spacing of the two outer edges of the ring bands 5, 6. Thus, the fastening means 9, e.g. screwed down bolts or the like, can be so positioned that they allow an angular offset the timber connecting elements by 180° about their longitudinal axis 11 without any change to the position of the fastening points. Thus, two wooden beams 7 of a post can be fitted at the same height without any need for the staggering of e.g. the drill holes in the beam. By means of a stop 10, assembly is significantly facilitated, because the wooden beam 7 can be moved up to the stop 10 and then the fastening means 9 can be more easily fitted through the associated bores to the beam 7. The edge 12 on the fastening straps 3, 4 additionally serves as a stop on tilting the timber connecting element on the post 8 as a result of the load through the wooden beam 7. This reliably prevents any slipping of the timber connecting element 1 or 2. The ring bands 5 and 6, as well as the fastening straps 3 and 4 also have ventilation holes 13 to prevent or reduce damage to the wood by moisture under the parts of the connecting elements. The timber connecting elements are so designed that the edge 20 of the particular fastening strap is aligned with the edge 21 of the outer ring band, which leads to projecting edges and corners.

Figure 3:
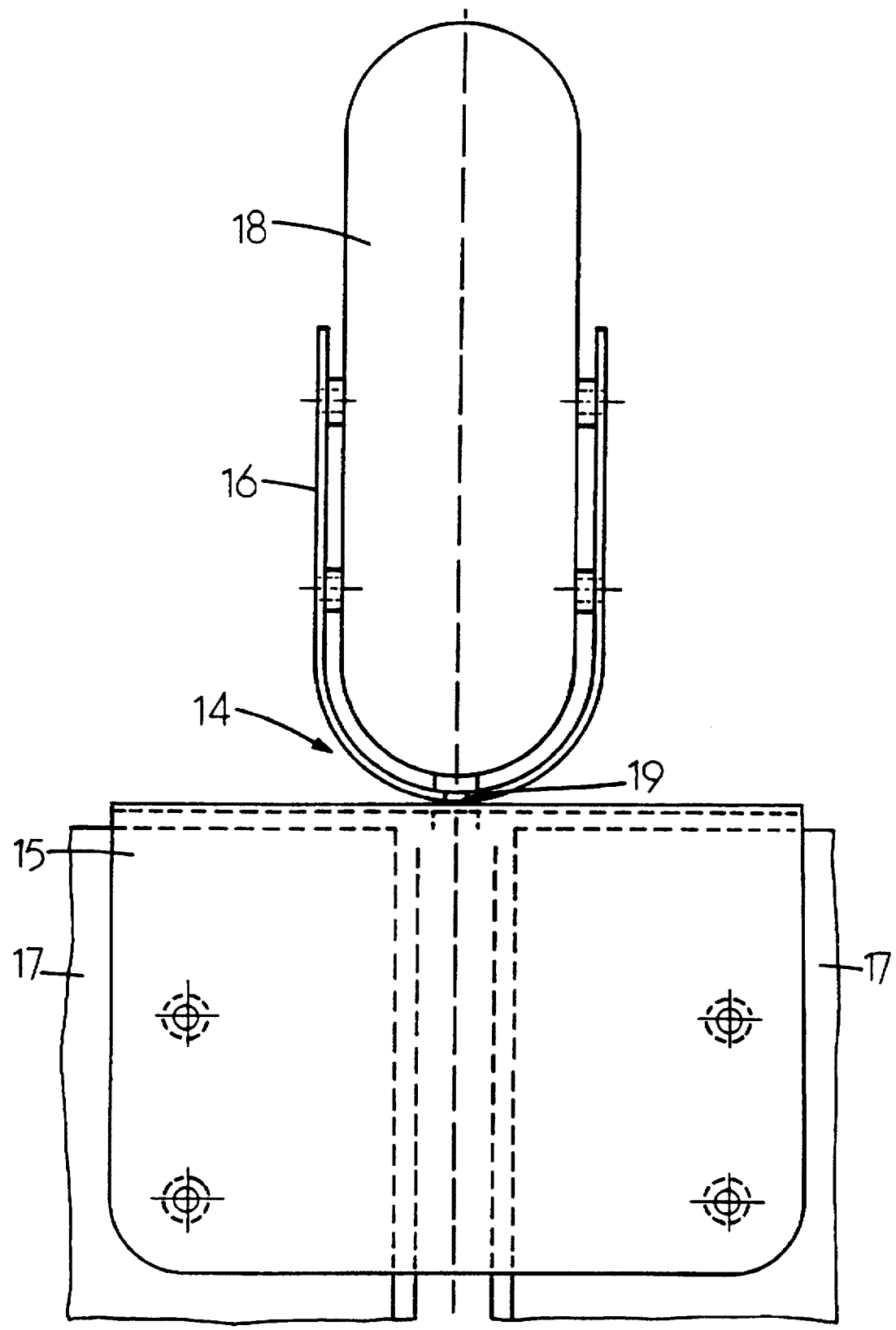
FIG. 3 is a side view of a second connecting element interconnecting three crossbeams.

FIG. 3 shows the second timber connecting element 14 with the U-shaped retaining part 15, 16. In the embodiment shown in FIG. 3 the sides of the lower retaining part are so wide, that they overlap two wooden beams 17 and serve for the fixing thereof. In use cases where the wooden beam 18 only rests on one wooden beam 17, the sides of the retaining part can be made narrower. As can be gathered from the drawing, the wooden beams 17 and 18 are held in the retaining parts 15 and 16 in spaced manner, e.g. by corresponding screw connections and washers, so that moisture cannot bring about any damage to the wood. The two retaining parts 15 and 16 are fixed to one another by a bolt 19 around which the two retaining parts can rotate by 360°. As a result of this design the main girder 17 and crossbeam 18 can be arranged at a random angle to one another.

The individual timber connecting elements are made from high-grade steel, so that no further care and treatment are required.

Figure 4:
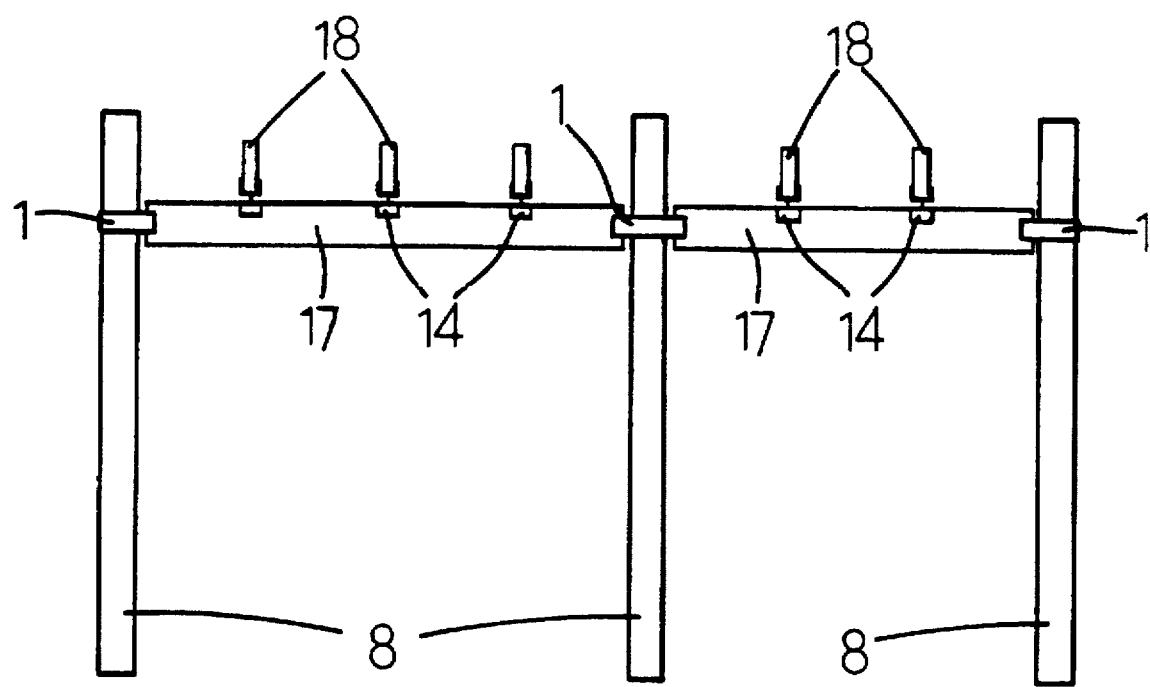
FIG. 4 is a diagrammatic representation of the wooden structure with the connecting elements.

FIG. 4 diagrammatically shows a wood structure with three posts 8, which can be made from wood or concrete. At the upper end on the post 8 are provided first timber connecting elements 1 and in the case of the central post two first connecting elements are fitted, as can be gathered from FIG. 2. The first connecting elements carry wooden beams 17 acting as main girders on which are fixed wooden beams 18 acting as secondary girders by means of two timber connecting elements 14. The angles between the individual wooden beams 17 and 18 can be adjusted as required by means of the connecting elements according to the invention.

I claim:

1. A timber connecting system for wood structures, said system comprising, in combination with a post and a plurality of wooden beams:

at least one first connecting element for connecting said post to one of said wooden beams, said first connecting element having:

two spaced-apart ring bands of substantially the same width adapted to encircle said post one above another and open at one side of the bands and of internal diameters corresponding to an external diameter of the post, a pair of mutually juxtaposed fastening straps for receiving said one of said beams between them, said straps being connected to corresponding ends of said bands and interconnecting said bands while extending away from said post, said bands being spaced by a distance at least equal to said width, said straps being of a width greater than the widths of said ring bands, and fastening means on said straps for securing said straps to said one of said beams, said fastening means being disposed symmetrically with respect to a longitudinal axis through said first connecting element extending along and located between said straps perpendicular to said post so that upon rotation of said first connecting element through 180° about said axis there is no change in positions of said fastening means relative to said one of said wooden beams; and at least one second connecting element for securing two of said wooden beams together, said second connecting element including:

two U-shaped retaining parts each receiving a respective one of said wooden beams and having closed ends adjacent one another, and pivot means interconnecting said closed ends to enable said retaining parts to rotate about a longitudinal axis of said second connecting element.

2. The timber connecting system defined in claim 1, further comprising a stop formed on said straps and serving as an assembly aid for attachment of said straps to said wooden beam.

3. The timber connecting system defined in claim 1 wherein said bands are formed with holes for ventilating said post encircled by said bands.

4. The timber connecting system defined in claim 1 wherein said straps are formed with holes for ventilating a respective one of said wooden beams received between said straps.

5. The timber connecting system defined in claim 1 wherein said pivot means includes a shaft to which said retaining parts are fastened and enabling rotation of said retaining parts through 360°.

6. The timber connecting system defined in claim 1 wherein means is provided for spacing said retaining parts from said wood beams.

* * * * *